(12) United States Patent
Michalowski et al.

(10) Patent No.: US 11,726,448 B1
(45) Date of Patent: Aug. 15, 2023

(54) ROBOTIC WORKSPACE LAYOUT PLANNING

(71) Applicant: Intrinsic Innovation LLC, Mountain View, CA (US)

(72) Inventors: Marek Michalowski, San Francisco, CA (US); Michael Beardsworth, San Francisco, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 0 days.

(21) Appl. No.: 17/557,679

(22) Filed: Dec. 21, 2021

Related U.S. Application Data

(63) Continuation of application No. 16/265,123, filed on Feb. 1, 2019, now Pat. No. 11,209,798.

(51) Int. Cl.
*G05B 19/4097* (2006.01)

(52) U.S. Cl.
CPC ............ *G05B 19/4097* (2013.01); *G05B 2219/35012* (2013.01); *G05B 2219/50391* (2013.01)

(58) Field of Classification Search
None
See application file for complete search history.

(56) References Cited

U.S. PATENT DOCUMENTS

| | | | |
|---|---|---|---|
| 6,463,360 B1 | 10/2002 | Terada | |
| 6,748,704 B2 | 6/2004 | Eguchi et al. | |
| 7,725,857 B2 | 5/2010 | Foltz et al. | |
| 9,824,554 B2 | 11/2017 | Latheef et al. | |
| 2002/0128810 A1 | 9/2002 | Craig et al. | |
| 2009/0204234 A1 | 8/2009 | Sustaeta et al. | |
| 2016/0125335 A1 | 5/2016 | Cheng | |
| 2018/0276590 A1 | 9/2018 | Kubo | |
| 2018/0333749 A1 | 11/2018 | Wagner | |

OTHER PUBLICATIONS

Essers et al., "A function based approach for designing intelligent flexible automated manufacturing environments," Presented at 45th CIRP Conference on Manufacturing Systems: University of Patras, Athens, Greece, May 16-18, 2012, 6 pages.
FastCompany.com [online] "My quest to create self-building, self-tooling, people-free manufacturing plants," Jul. 2, 2013, retrieved on Feb. 1, 2019, retrieved from: URL<https://www.fastcompany.com/3013789/my-quest-to-create-self-building-sell-tooling-people-free-manufacturing-plants?cid=search>, 7 pages.

(Continued)

*Primary Examiner* — Sean Shechtman
(74) *Attorney, Agent, or Firm* — Fish & Richardson P.C.

(57) ABSTRACT

This specification describes systems, methods, devices, and other techniques for planning workspaces for automated fabrication processes. A computing system facilitates planning by receiving a set of parameters for planning a layout of a workspace for an automated fabrication process, and generating a plurality of candidate workspace layouts, including selecting, for each candidate workspace layout, (i) one or more robots for performing tasks in the automated fabrication process and (ii) corresponding locations for the one or more robots within the workspace. The system determines an optimal workspace layout based on the plurality of candidate workspace layouts, generates a workspace layout specification for the optimal workspace layout, and provides the workspace layout specification to one or more second computing systems.

18 Claims, 6 Drawing Sheets

(56) References Cited

OTHER PUBLICATIONS

Forbes.com [online], "The future of factories," Jun. 19, 2018, retrieved on Feb. 1, 2019, retrieved from: URL<https://www.forbes.com/sites/forbestechcouncil/2018/06/19/the-future-of-factories/#4294973c1791>, 5 pages.

Liggett, "Automated facilities layout; past, present and future," Automation in Construction 9, 2000, pp. 197-215.

Loof, "Strategy for automation and layout change in production systems," Thesis for the degree of Masters in Production, Royal Institute of Technology, Stockholm, Sweden, 2010, 39 pages.

www2.deloitte.com [online] "The smart factory," 2017, retrieved on Feb. 1, 2019, retrieved from: URLhttps://www2.deloitte.com/content/dam/insights/US/articles/4051_The-smart-factory/DUP_The-smart-factory.pdf, 24 pages.

ROBOTIC WORKSPACE LAYOUT PLANNING

CROSS-REFERENCE TO RELATED APPLICATION

This application is a continuation application of, and claims priority to, pending U.S. application Ser. No. 16/265,123, filed on Feb. 1, 2019. The entirety of the disclosure of the prior application is herein incorporated by reference.

BACKGROUND

Manufacturing processes for many types of goods have become increasingly automated in recent years. Automated equipment, such as kinematic arms, mobile robots, and the like, have been introduced onto factory floors and other work spaces to perform various tasks with a high-degree of precision and reliability. Raw or intermediately-processed material can flow through a manufacturing or other fabrication process, and can be machined, assembled, or otherwise refined to create an end product that can be enjoyed by a consumer. Moreover, with the introduction of automation and programmable robots, some workspaces can be rapidly reconfigured for different fabrication processes, and some resources (e.g., robots) can be re-purposed and re-programmed for different fabrication processes. In some cases, the layout of a workspace, including the selection of robots or other equipment for a fabrication process and the locations of the robots within the workspace, can impact the efficiency and cost of production of certain goods.

SUMMARY

This specification describes systems, methods, devices and other techniques for planning workspaces for a fabrication process. A fabrication process generally refers to a process for producing goods, such as parts, assemblies, or articles of manufacture. For example, the fabrication process can be a machining process for fabricating parts, an assembly process for assembling component parts into a larger structure, a chemical process for synthesizing materials, or a combination of these and other processes. The fabrication process can employ robots to fully or partially automate the process. The workspace refers to an environment where at least a portion of the fabrication process is carried out, such as a factory floor or a laboratory. Through the techniques disclosed in this specification, the layout of a workspace for a fabrication process can be automatically planned using relatively primitive inputs, and the layout can be generated in a manner that optimizes a set of layout criteria such as cost and performance criteria. In some cases, an optimal workspace layout can be determined by evaluating only a representative subset of possible layouts, thereby allowing the system to more quickly identify an optimal layout and avoiding computational expense that would otherwise be incurred by evaluating all identified candidate layouts.

In a first aspect, implementations of the subject matter disclosed herein include computer-implemented methods. The methods can be performed by a first computing system and can include actions of receiving a set of parameters for planning a layout of a workspace for an automated fabrication process; generating a plurality of candidate workspace layouts, including selecting, for each candidate workspace layout, (i) one or more robots for performing tasks in the automated fabrication process and (ii) corresponding locations for the one or more robots within the workspace; determining an optimal workspace layout based on the plurality of candidate workspace layouts; generating a workspace layout specification for the optimal workspace layout; and providing the workspace layout specification to one or more second computing systems.

These and other implementations can optionally include one or more of the following features.

Determining the optimal workspace layout can include selecting, from among the plurality of candidate workspace layouts, a particular workspace layout as the optimal workspace layout, the particular workspace layout selected based on the particular workspace layout optimizing an objective function better than other ones of the plurality of candidate workspace layouts.

The workspace layout specification can be used to configure the workspace consistent with the optimal workspace layout.

Providing the workspace layout specification to the one or more second computing systems can include instructing a mobile robot defined in the workspace layout specification to automatically move to a particular location in the workspace identified by the workspace layout specification, thereby causing the mobile robot to automatically move to the particular location.

Generating the workspace layout specification can include generating a computer-aided design (CAD) file storing data representing the optimal workspace layout.

The workspace can include factory floor space that has been allocated for the automated fabrication process, and the automated fabrication process can include a manufacturing process.

The set of parameters for planning the layout of the workspace can include product design parameters that describe a physical design of a product of the automated fabrication process and environmental parameters that describe physical attributes of the workspace.

The set of parameters for planning the layout of the workspace further can include resource parameters that describe a catalog of available resources for implementing the automated process and corresponding costs for use of the resources.

The set of parameters for planning the layout of the workspace further can include process parameters that describe tasks to be performed in the automated fabrication process.

The first computing system can determine an objective function for evaluating candidate workspace layouts, and determining the optimal workspace layout can include selecting one of the plurality of candidate workspace layouts that optimizes the objective function.

The objective function can be programmed to promote selection of similar resources to implement the automated fabrication process, penalize selection of dissimilar resources to implement the automated fabrication process, or both.

Generating the plurality of candidate workspace layouts can further include, for at least one of the candidate workspace layouts, selecting one or more sensors and corresponding locations for the one or more sensors in the workspace. The one or more sensors can be configured to monitor execution of the automated fabrication process.

Generating the plurality of candidate workspace layouts can include spatially discretizing the workspace and determining locations for the one or more robots in the workspace that correspond to discretized points. In some implementations, a continuous range of locations for the robots can be evaluated, and optimal locations (e.g., locations that maximize an objective function) can be selected by evaluating the continuous function iteratively, using gradient descent, Newton's method, or other suitable techniques.

Determining the plurality of candidate workspace layouts can include generating a decision tree, wherein each internal node of the decision tree represents a partially defined candidate workspace layout, and sibling nodes represent alternative candidate workspace layouts that differ from each other in at least one dimension.

Each leaf node in the decision tree represents a fully defined candidate workspace layout.

Determining the optimal workspace layout can include traversing the decision tree, including at each internal node, following a path through a particular child node of the internal node that best optimizes an objective function among multiple child nodes of the internal node.

The computing system can be configured to iteratively generate nodes along the decision tree and to incrementally traverse the decision tree along a path that optimizes the objective function.

Generating the plurality of candidate workspace layouts can include selecting, from a set of alternative candidate workspace layouts, the plurality of candidate workspace layouts as a representative subset of candidate workspace layouts. Determining the optimal workspace layout can include evaluating the candidate workspace layouts to the exclusion of other workspace layouts from the set of alternative candidate workspace layouts that are not part of the representative subset.

Additional aspects of the subject matter disclosed herein include one or more computer-readable media having instructions stored thereon that, when executed by one or more processors, cause the one or more processors to perform any of the methods or processes described herein. Still other aspects of the subject matter disclosed herein systems having one or more processing devices and one or more computer-readable media. The computer-readable media of the system can be encoded with instructions that, when executed by the one or more processing devices, cause performance of any of the methods or processes described herein.

Some implementations of the subject matter disclosed herein can, in certain instances, realize one or more of the following advantages. First, by processing a wide range of input layout parameters, the system can automatically determine an optimized workspace layout for a fabrication process. In some cases, the optimized workspace layout can be determined with minimal or no human supervision and the layout can be determined while accounting for a large domain of input parameters that could not otherwise be processed within a specified time constraint. Second, by determining an optimized workspace layout based on an under-constrained set of input layout parameters, the system can optimize multiple aspects of the fabrication process concurrently, including a layout of the workspace, and a sequence of tasks to be performed during the fabrication process. In some implementations, the system iteratively evaluates changes to both the fabrication process itself and the workspace layout so that an optimal combinations of parameters can be determined, rather than optimizing one of the process or the layout before the other. Third, by evaluating only a representative subset of candidate workspace layouts, the system can more efficiently identify an optimized workspace layout, thereby saving time and computational expense. Fourth, by utilizing a candidate workspace layout tree, partial workspace layouts can be iteratively evaluated so that an optimal layout can be determined without requiring that a complete workspace layout be generated in each iteration when a change is made to a candidate layout.

These and other advantages will be apparent to one of ordinary skill in the art in light of the description in this specification, including the drawings, and the claims.

DETAILED DESCRIPTION

Figure 1A:
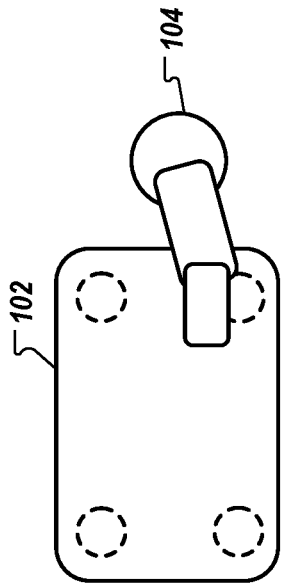
FIGS. 1A-1D depict example diagrams of four candidate layouts of a robotic work cell for a fabrication process.
Figure 1B:
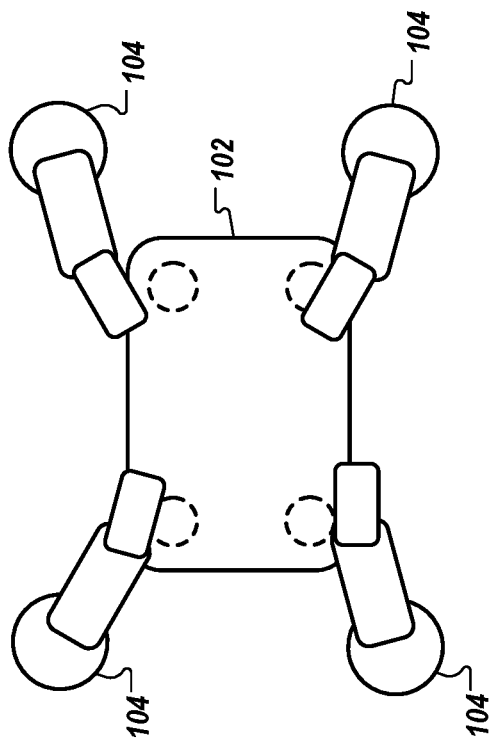

FIGS. 1A-1D respectively depict example diagrams of four candidate layouts of a robotic work cell for a fabrication process. A work cell is a portion of a workspace where one or more tasks (e.g., a group of tasks) related to a fabrication process are performed. A complete workspace can include one or more work cells, and in some cases can include many (e.g., tens or hundreds) of work cells. Moreover, a work cell can be automated, in that the tasks performed at the work cell can be performed without human direction or control. For instance, the work cells depicted in FIGS. 1A-1D each employ at least one robot (e.g., kinematic arms 104) to perform the tasks assigned to the work cell. In this example, the tasks involve drilling out four holes at the corners of a work piece 102 (e.g., a sheet of metal, plastic, wood, or other material). Although the robots here are depicted as kinematic arms having multiple articulating segments and a rotating base to enable fine movements of tools (e.g., drill bits, torches, welding or soldering guns) coupled to a distal end of the arm, this specification broadly refers to robots as encompassing any machinery that employs sensors and actuators to perform tasks in an automated manner, e.g., without human direction or control. Thus, automated machine tools such as CNC (computer numerical control) machines, conveyance systems, automated guided vehicles (AGVs), drones, and the like may also be considered as robots for the purpose of this specification. Some robots may be mobile and capable of moving independently around a workspace, while other robots may be stationary and fixed at a particular location of the workspace.

In some implementations, the techniques disclosed herein determine optimal layouts of a work cell or workspace that maximizes the quality of the work cell or workspace with respect to an objective function. The quality of a layout for a work cell, or of a workspace more generally, can be a function of one or more layout criteria. Each layout criterion quantifies an aspect of the layout, such as the layout's compliance with resource, process, quality metrics indicating the layout's impact on a quality of the process or resulting fabricated product (e.g., how well the layout facilitates execution of a quality process such as the accuracy and reliability of robots employed in the process), and/or design constraints, a speed at which tasks can be executed given the layout, and a cost of implementing the layout (e.g., a cost of the robots and/or other equipment necessary to implement the layout). A planning system can then convert a set of inputs for a fabrication process into a set of candidate layouts for the process, and can determine an "optimal" layout from the candidate layouts by evaluating the candidate layouts with respect to one or more pre-defined layout criteria. As used herein, the term "optimal" does not necessarily imply a layout that is truly a best layout among all possible layouts for a fabrication process, but instead also may refer to a pseudo-optimal layout that optimizes layout criteria better than other evaluated candidate layouts for the process.

The layout of a work cell or a workspace represents a selection of components (resources) for the work cell or workspace and corresponding locations (e.g., positions) for each component in the environment of the work cell or workspace. Optionally, the layout can further define orientations of the components, time-dependent locations and/or orientations of the components, configurations of the components, or combinations of these and other attributes of the components. The layout of a work cell or a workspace can, in many cases, impact how efficiently a fabrication process can be performed. For example, the farther a robot is located from its work locations and the more separation that exists between the work locations will generally require additional time and movement for the robot to complete tasks than if the robot were located closer to its work locations. An "optimal" layout may, for instance, be a layout that optimizes an objective function that balances performance-type layout criteria (e.g., execution feasibility, speed, and/or quality) with cost-type layout criteria (e.g., cost of equipment for the layout).

Figure 1C:
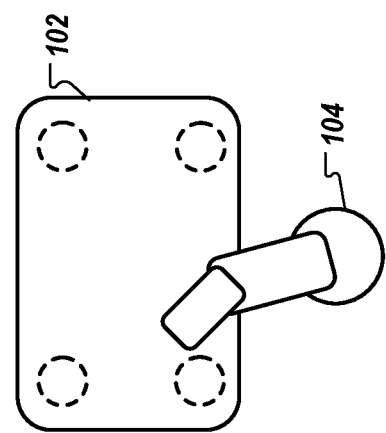
Figure 1D:
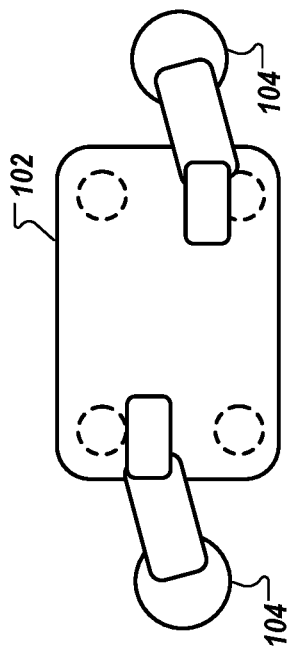

In the layouts shown in FIGS. 1A-1D, different selections and locations of robotic arms 104 are shown relative to work-piece 102. For the candidate layout of FIG. 1A, a single robotic arm 104 is provided to drill all four holes in the work-piece 102, and the arm 104 is located to the front of the work-piece 102. For the candidate layout of FIG. 1B, a single robotic arm 104 is provided to drill all four holes in the work-piece 102, and the arm 104 is located to the right side of the work-piece 102. For the candidate layout of FIG. 1C, a pair of robotic arms 104 are provided to drill two holes each in the work-piece 102, and the arms 104 are located on either side of the work-piece 102. For the candidate layout of FIG. 1D, four robotic arms 104 are provided for drilling respective holes at each corner of the work-piece 102. The first and second layouts of FIG. 1B conserve the most resources by using just a single robotic arm 104 to complete the specified tasks (e.g., drilling holes) on the work-piece 102, but may diminish a speed of execution of the tasks since only one hole can be drilled at a time. The fourth layout of FIG. 1D may facilitate the fastest execution of the tasks since all four holes could be drilled simultaneously using the respective robotic arms 104. The third layout of FIG. 1C provides an intermediate solution that balances resource usage with speed of execution. As described further with respect to FIGS. 2-5, the quality of candidate layouts can be assessed by evaluating an objective function that reflects a set of specified layout criteria. In some implementations, the candidate layout that best optimizes the objective function is deemed the "optimal" layout, and the system can store, process, print, perform operations on, or otherwise output a workspace layout specification for the optimal layout. For example, if the objective function places greater weight on the cost of a layout than speed of execution, then the layouts of FIGS. 1A or 1B may be selected as the "optimal" layout. In contrast, if the objective function places a greater weight on the speed of execution offered by the layout than cost, then the layout of FIG. 1D may be selected as the "optimal" layout.

Figure 2:
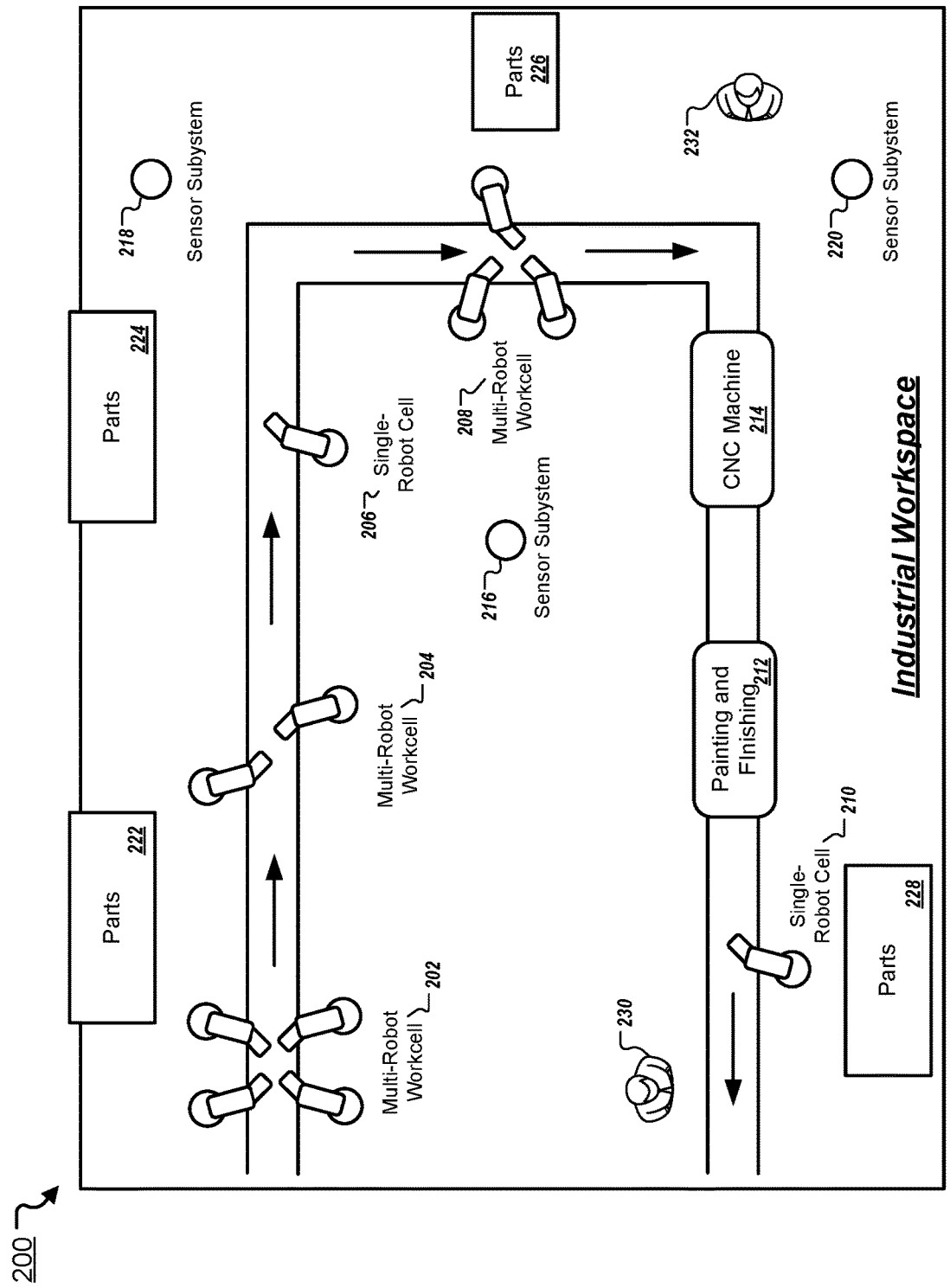
FIG. 2 depicts a diagram of an example workspace for an automated fabrication process.

Referring to FIG. 2, a diagram is shown of an example workspace 200 (e.g., a factory floor) for an automated fabrication process. In this example, the workspace 200 includes a conveyor track for moving a work-piece from a starting location in the workspace 200 to an ending location. As the work-piece moves along the conveyor track, it can make stops at various work cells where different tasks are performed in furtherance of the fabrication process. For example, various machining and assembly tasks may be performed at the stations defined by work cells 202, 204, 206, and 208, CNC machining may be performed by CNC machine 214, painting and finishing may be performed at station 212, and packaging may be performed at station 210. Additionally, the workspace 200 can include parts racks 222-228 storing tools and materials that could be needed during the fabrication process.

The workspace 200 also includes sensor subsystems 216-220, which are configured to monitor performance of the fabrication process. The sensor subsystems 216-220 may include cameras, for example, that capture still images or video of the fabrication process. The images or video can be analyzed using computer vision technologies to determine the status of the process from time to time, and to determine performance metrics or detect failures based on the status reports. Human floor supervisors 230 and 232 can also be provided to monitor performance of the fabrication process and, optionally, to perform one or more tasks in furtherance of the fabrication process. For instance, as shown in FIG. 2, a workspace 200 can include multiple robotic work cells having the same or different configurations from each other, as well as additional components such as part racks, sensors, and human supervisors. A planning system as described herein can, in some implementations, lay out an optimal workspace for a fabrication process from scratch based on relatively primitive inputs.

Figure 3:
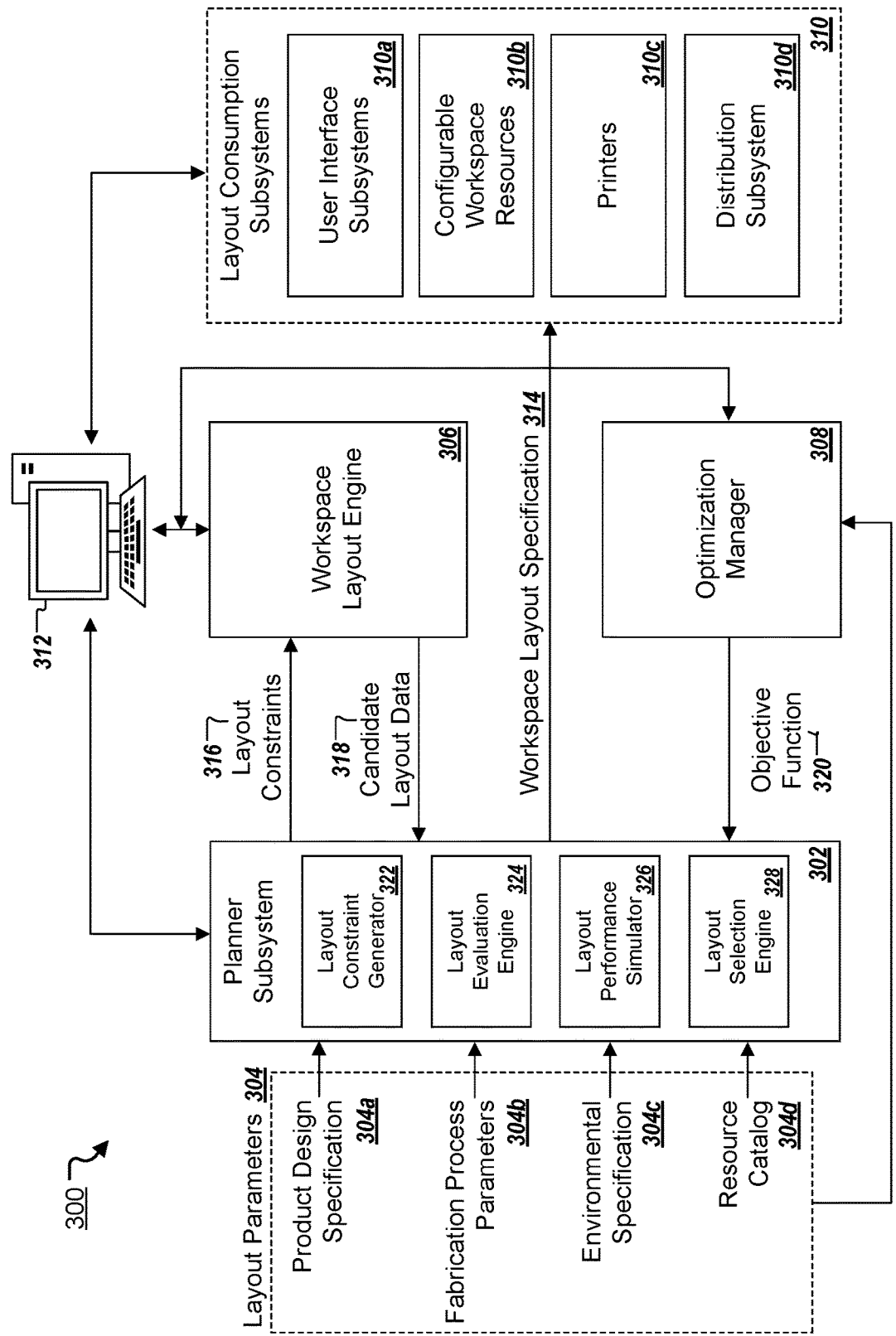
FIG. 3 depicts a block diagram of an example system for planning a layout of a workspace for a fabrication process.

FIG. 3 is a block diagram of an example system 300 for planning a layout of a workspace for a fabrication process. In general, the system 300 can be implemented on one or more computers in one or more locations. The system 300 can be centralized or distributed, and can include computers configured to perform operations consistent with those described in this specification. Although some implementations of the system 300 provide several subsystems (e.g., planner 302, workspace layout engine 306, optimization manager 308) that may be physically, virtually, and/or logically distinct from each other, other implementations may divide operations of the system in different combinations among different subsystems, or particular operations performed by different subsystems may be consolidated into a single subsystem. Each subsystem can be implemented on one or more computers in one or more locations, which may be the same computers or different computers from which other ones of the subsystems are implemented upon. In the example of FIG. 3, the system 300 includes a planner subsystem 302, a workspace layout engine 306, an optimization manager 308, one or more layout consumption subsystems 310, and a user terminal 312.

The planner subsystem 302 is configured to process sets of layout parameters 304 to generate a workspace layout specification 314. The workspace layout specification 314 is a structured data file that defines an optimized layout for a workspace. The layout parameters 304 are provided as inputs to the planner subsystem 302 and describe information about the fabrication process and the workspace environment, which the planner subsystem 302 can use to determine the optimized workspace layout. In general, the layout parameters 304 can be relatively primitive, in that they describe information about available resources and fabrication and environmental constraints without directly specifying information about a proposed layout for the workspace. Rather, the planner subsystem 302 can process the raw layout parameters 304 to generate an optimized workspace layout and a workspace layout specification 314 representing the same.

In some implementations, the planner subsystem 302 is configured to process layout parameters 304 from at least one of the following groups of parameters: product design specification parameters 304a, fabrication process parameters 304b, environmental specification parameters 304c, and resource catalog parameters 304d.

The product design specification parameters 304a describe information about the product that is to be constructed through the fabrication process. The product design specification parameters 304a can include, for example, machining instructions for machining parts for a product, assembly instructions for assembling parts into a larger product, product dimensions and fabrication tolerances, constraints that define required dimensions and/or relationships between two or more parts or portions of the product, or combinations of these and/or other product design information. In some implementations, the product design specification parameters 304a are specified in the form of a computer-aided design (CAD) file that fully defines the geometry and/or assembly of the product, or the product design specification parameters 304a are derived from a CAD file for the product.

The fabrication process parameters 304b describe information about fabrication processes that have been prescribed for use in the fabrication process or that are available for use in the fabrication process. In some implementations, the fabrication process parameters 304b specify tasks that can be performed to transform raw materials into finished material for use in the fabricated product that is the subject of the fabrication process. For example, the fabrication process parameters 304b can specify tasks for drilling, milling, fastening, adhering, cutting, molding, forging, riveting, welding, soldering, connecting, or painting to create or refine work-pieces for the product of the fabrication process. The fabrication process parameters 304b can also specify dependencies among different tasks or processes, such as dependencies that require some tasks or processes to be performed (e.g., initiated or completed) before others. For example, the fabrication process parameters 304b may specify a set of tasks for fabricating a component of an assembly, coupling the component to other pieces in the assembly, and painting the assembly. The fabrication process parameters 304b may leave some tasks and dependencies unconstrained, such that the system 300, or another downstream system, can define them as part of the process for generating an optimized workspace layout, or can subsequently define them within the context of an optimized workspace layout. Thus, the system 300 can use the fabrication process parameters 304b to select resources and determine a layout of a workspace that meets the requirements of the fabrication process parameters 304b, while optimizing unconstrained aspects of the fabrication process.

The environmental specification parameters 304c describe information about the workspace for the fabrication process. The environmental specification parameters 304c can indicate, for example, information about a size of the workspace, dimensions of the workspace, a shape of the workspace (e.g., as indicated by a blueprint or map of the workspace), utilities available to the workspace (e.g., information about electrical, water, waste, and/or natural gas availability, and the capacity and cost of each utility), or a combination of these. In some implementations, the environmental specification parameters 304c can also define costs or other constraints associated with different regions of the workspace. For example, to promote more efficient use of workspace and a smaller footprint for the fabrication process, the parameters 304c can impose higher costs on some regions of the workspace that would require use of additional space beyond a core region of the workspace having a lower cost. As another example, some regions of the workspace can be associated with higher costs of use than others based on externalities such as proximity to utility access points, regulations, noise concerns, safety concerns, or the like. In some cases, workspace regions can each be associated with a corresponding set of process-specific costs such that the cost of use or occupancy of a given region depends on the particular process for which the region is employed (e.g., painting, machining, soldering, molding).

In some implementations, the environmental specification parameters 304c are specified based on human input or based on manually created blueprints or maps of the workspace. In some implementations, the environmental specification parameters 304c can be automatically generated based on observations or measurements of the workspace environment taken with one or more sensor subsystems in the environment. For example, a depth-based imaging system (e.g., having stereoscopic cameras and/or light detection and ranging (LIDAR) sensors) can be placed in the workspace and activated to capture images and distance information about the environment from which a point cloud or other 3D model of the environment can be created. The point cloud or 3D model can then be processed using machine-learning models (e.g., deep neural networks) to extract features of the environment such as dimensions of the workspace, a map or blueprint of the workspace, and/or features of the workspace that indicate the suitability of different regions for particular processes or resources. For example, the machine-learning model may generate outputs indicating suitable/eligible and unsuitable/non-eligible regions of the environment for the placement of particular types of robots, fabrication process monitoring sensors, and/or other resources.

The resource catalog parameters 304d are inputs that describe a library of resources that are available for use in the fabrication process. The system 300 can select resources from the library when generating a layout of the workspace, and the selected resources can be employed in the fabrication process for one or more products in which the workspace will be used to create. Resources in the library can include robots that directly perform tasks in the fabrication process as well as auxiliary equipment that indirectly facilitate the fabrication process. For example, the resource catalog parameters 304d can identify available auxiliary equipment such as conveyors, forklifts, jacks, personnel, storage racks, bins, and the like. The resource catalog parameters 304d can further include modular tooling that can be secured to and employed by one or more robots (e.g., at an end of the robot's kinematic arm), thereby allowing robots to be re-configured with different available tools and/or between fabrication processes. In some implementations, the resource catalog parameters 304d can indicate resource constraints such as a maximum number of available resources for the fabrication process and/or costs of using or procuring a given resource. For instance, an organization that already owns n units of a given resource that have not been purposed for another use may make those resources available to the new fabrication process at a relatively low cost. However, the parameters 304d may define a cost schedule for the resource such that the cost is significantly higher for the use of each unit of the resource greater than n because of the cost of procuring additional units of the resource.

The planner subsystem 302 processes the layout parameters 304 to determine an optimized workspace layout and to generate a workspace layout specification 314 that that describes the optimized workspace layout. To do this, the planner subsystem 302 can include a layout constraint generator 322, a layout evaluation engine 324, a layout performance simulator 326, and a layout selection engine 328. Further, the planner subsystem 302 interacts with a workspace layout engine 306, an optimization manager 308, and, optionally, a user terminal 312 in the course of determining the optimized workspace layout and generating the workspace layout specification 314. In general, the planner subsystem 302 iteratively evaluates candidate workspace layouts generated by the workspace layout engine 306 with respect to an objective function 320 provided by the optimization manager 308. The planner subsystem 302 can provide feedback to the workspace layout engine 306 to guide its generation or selection of candidate workspace layouts, and the top candidate workspace layout(s) can be provided as an output of the planner subsystem 302 as the top "optimized" workspace layouts.

The layout constraint generator 322 processes the layout parameters 304 and, optionally, inputs from user terminal 312 and simulation and evaluation results from previously simulated and evaluated candidate workspace layouts, to generate a set of layout constraints 316. The layout constraints 316 describe constraints for candidate workspace layout generation by the workspace layout engine 306. In some implementations, the layout constraints 316 include parameters that have been directly imported from the layout parameters 304, such as product design specification parameters 304a, fabrication process parameters 304b, environmental specification parameters 304c, and/or resource catalog parameters 304d. In some implementations, the layout constraint generator 322 derives at least some of the layout constraints 316 from the layout parameters 304, where such constraints are not directly specified in the layout parameters 304 themselves. For example, the layout constraint generator 322 can process a blueprint or map of the workspace, as indicated by the environmental specification parameters 304c, to determine relevant features of the workspace (e.g., dimensions or a size of the workspace) that can be used by the workspace layout engine 306 to generate a candidate workspace layout. The layout constraint generator 322 can structure, format, and/or filter information from the layout parameters 304 into data that can be processed by the workspace layout engine 306. Additionally, the layout constraint generator 322 can define additional constraints that are not specified in the layout parameters 304 but that further guide the generation or selection of candidate workspace layouts, such as instructions to maintain a portion of the layout without change from a previously evaluated workspace layout or instructions to change a portion of the layout from a previously evaluated workspace layout.

The workspace layout engine 306 processes the layout constraints 316 and generates or selects a candidate workspace layout based on the constraints 316. The candidate workspace layout can define, for example, a selection of components for an entirety or a portion (e.g., a work cell) of the workspace for the fabrication process. The candidate workspace layout identifies a candidate selection of resources to carry out the fabrication process, and a candidate arrangement of the resources within the workspace. For example, the candidate workspace layout can define a series of workcells for performing corresponding groups of actions or tasks in furtherance of the fabrication process. The candidate workspace layout can define locations for the workcells within the workspace, a workflow for moving work-pieces and other items between the workcells, and a configuration of each workcell (e.g., a selection of a robots for the work cell and their locations and orientations in relation to one another). The candidate workspace layout can also define locations of sensors for monitoring execution of the fabrication process, and can define a selection and arrangement of auxiliary resources that indirectly facilitate the fabrication process (e.g., conveyors, storage racks, storage bins). In some implementations, the workspace layout engine 306 utilizes a decision tree to determine permutations of candidate layouts, where each node in the decision tree represents a different candidate workspace layout, sibling nodes represent alternative layouts that vary in one or more dimensions (e.g., selections and/or locations of one or more resources), and child nodes inherit all properties of its ancestors while also defining at least one additional aspect of the environment that was not defined by its ancestors until the leaf nodes represent alternative completely defined candidate workspace layouts. Additional detail about a candidate workspace layout tree is described with respect to FIG. 4.

The workspace layout engine 306 provides to the planner subsystem 302 candidate layout data 318 that describes a particular candidate workspace layout. The layout evaluation engine 324 then evaluates the candidate workspace layout to assess how well it optimizes one or more specified workspace layout criteria. Each workspace layout criterion can represent a measure of quality of the candidate workspace layout, such as the layout's compliance with resource, process, and/or design constraints, a speed at which tasks can be executed in view of the layout, and a cost of implementing the layout (e.g., a cost of the robots and/or other equipment or resources necessary to implement the layout). The workspace layout criteria to be applied by the system 300 can be set by default or may be specified by user input through the user terminal 312. The optimization manager 308 is configured to maintain the applicable set of workspace layout criteria and to configure the planner subsystem 302 to utilize the applicable set of workspace layout criteria to evaluate candidate workspace layouts. In some implementations, the optimization manager 308 generates an objective function 320 based on multiple workspace layout criteria. For example, the objective function 320 may be a weighted sum of workspace criteria that, when evaluated, provides an overall quality score for a candidate workspace layout. The optimization manager 308 provides the objective function 320 to the layout evaluation engine 324, and the layout evaluation engine 324 uses the objective function 320 to assess the quality of each candidate workspace layout.

Some components (e.g., layout criteria) of the objective function 320 can be evaluated based on the candidate layout data 318 and the layout parameters 304, such as cost components representing the expense of resource selection or the cost of occupying different regions of the workspace. Other components of the objective function 320 relating to how well the candidate workspace layout facilitates the fabrication process (e.g., a speed or throughput of the fabrication process given the candidate workspace layout) can be predicted using the layout performance simulator 326. The layout performance simulator 326 implements a simulation of the fabrication process in a virtual environment configured according to the candidate workspace layout. The simulator 326 can run many simulations of the fabrication process and determine performance metrics for the simulations such as failure rate, execution speed, energy consumption, throughput, and/or other metrics. The layout evaluation engine 324 can then use metrics from the virtual simulations to evaluate the objective function 320 for the candidate workspace layout.

In some implementations, the planner subsystem 302 iteratively evaluates candidate workspace layouts provided by the workspace layout engine 306, determines a quality score for each candidate workspace layout, and then the layout selection engine 328 determines an optimized workspace layout specification based on the quality scores. The layout selection engine 328 can select a candidate workspace layout as an "optimized" layout based on the quality score for that layout being most favorable among all evaluated candidate workspace layouts. In some implementations, the layout selection engine 328 is configured to return multiple optimized workspace layouts, e.g., the n highest-ranked candidate workspace layouts based on their quality scores. In some implementations, the planner subsystem 302 guides the succession of evaluated candidate workspace layouts by providing feedback to the workspace layout engine 306 about the quality of each evaluated layout. The feedback can include the quality score for the layout, metrics representing individual workspace layout criteria, simulation results, and/or indications of relative quality between a most recent candidate workspace layout and one or more previously evaluated workspace layouts. For example, the workspace layout engine 306 may provide the planner subsystem 302, all at one time or one at a time, a set of candidate workspace layouts that represent alternatives with respect to one or more aspects of the layout, such as the location of a particular robot, the location of a workcell, or the selection of a particular resource to perform a given task or set of tasks. The planner subsystem 302 can evaluate the quality of each alternative candidate layout, and then return an indication of the quality evaluations for the alternatives to the workspace layout engine 306. In some examples, the planner subsystem 302 returns an indication of the best alternative, e.g., the candidate workspace layout that yielded the most favorable quality score. The workspace layout engine 306 can then use the feedback (e.g., provided in layout constraints 316) to determine one or more subsequent candidate workspace layouts for the planner subsystem 302 to evaluate. In some cases, features of the best layout from a recent set of evaluations are locked-in or otherwise retained in subsequently developed candidate workspace layouts.

In some implementations, the workspace layout engine 306 provides alternative partially defined candidate workspace layouts to the planner subsystem 302. The planner subsystem 302 evaluates each alternative and returns to the workspace layout engine 306 an indication of the highest-quality alternative. The workspace layout engine 306 can then lock-in the unique feature(s) of the highest-quality alternative, and then add additional features in alternative arrangements to the highest-quality alternative to create a new set of alternatives. The new set of alternatives can be provided to the planner subsystem 302 for evaluation, and the planner subsystem 302 again determines the best alternative among the new set of alternatives. These operations can be iterated until a completely defined optimized workspace layout is defined. For example, the workspace layout engine 306 can traverse a workspace layout tree, where each set of alternatives correspond to sibling nodes at a particular level in a particular branch of the tree, and the workspace layout engine 306 determines a path or branch down the tree based on feedback from the planner subsystem 302. By evaluating partial candidate workspace layouts and iteratively adding features to the layouts, the system 300 can more efficiently evaluate layouts to arrive at an optimized layout, and can reduce processing expense that would otherwise stem from evaluation of complete layouts at each stage.

Upon determining an optimized workspace layout, the planner subsystem 302 outputs a workspace layout specification 314. The workspace layout specification 314 includes one or more files or data structures that define the optimized workspace layout. The workspace layout specification 314, for example, can include a CAD file for the optimized workspace layout. In some implementations, the workspace layout specification 314 includes software for programming robots provided in the layout to move to fixed positions in the workspace or to move to different positions in the workspace at different times or stages of the fabrication process. One or more layout consumption subsystems 310 may process the workspace layout specification 314. For example, a user interface subsystem 310a may present the optimized workspace layout to a user on a display. Robots or other configurable workspace resources 310b may be configured based on the workspace layout specification 314, e.g., by installing software provided in the workspace layout specification 314 that allows the resources 310b to configure themselves for operation consistent with the optimized workspace layout (e.g., by moving to locations of the workspace specified by the optimized workspace layout). In some implementations, one or more printers 310c may print the workspace layout specification 314. In some implementations, a distribution subsystem 310d may electronically distribute the workspace layout specification 314 to one or more subscribers.

Figure 4:
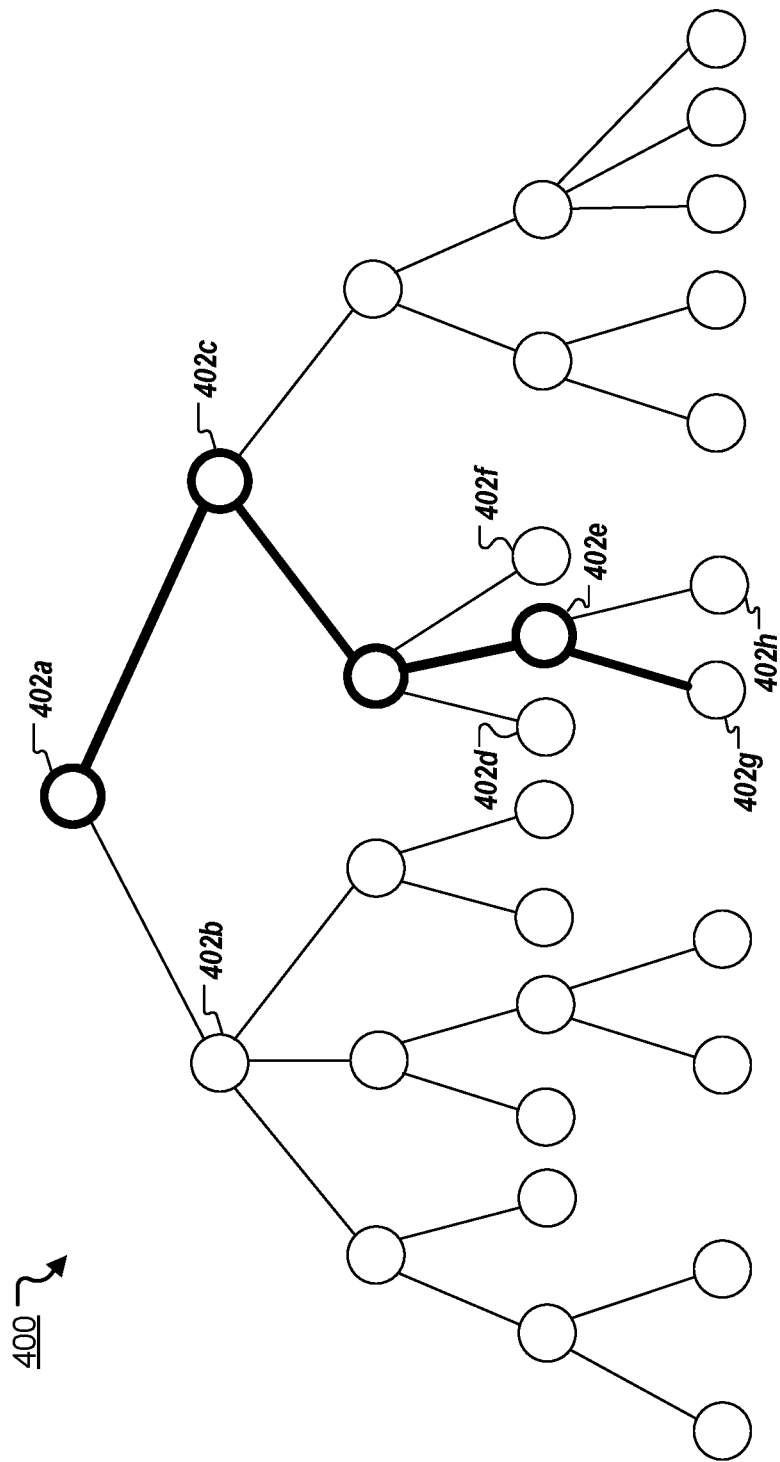
FIG. 4 is a conceptual diagram of an example candidate workspace layout tree.

FIG. 4 is a diagram of an example candidate workspace layout tree 400. A workplace planning system, e.g., system 300 (FIG. 3), can use a layout tree like that depicted in FIG. 4 to determine an optimized workspace layout. The layout tree 400 is a hierarchical tree having a various nodes 402 that each represent a candidate workspace layout. In some implementations, the leaf nodes represent fully defined or complete workspace layouts, while the ancestral nodes represent partially defined workspace layouts. The layouts represented by nodes at lower levels of the tree can generally be more fully defined than nodes at higher levels as each node can inherit elements of a layout from its parent and add one or more additional elements that were not defined in the parent node. Moreover, sibling nodes can represent workspace layouts that define alternative arrangements or configurations for the additional element(s) that are proposed to be added to the parent layout. For example, a parent node may represent a workcell, and each child of that parent may inherit the elements of the parent while providing, in addition, alternative elements to the workcell. Each alternative may be evaluated by a planner subsystem (e.g., planner 302), and the system may select the alternative that provides the optimal (e.g., highest quality) result, as determined by evaluation of an objective function that is based on one or more workspace layout criteria. For example, the system may arrive at an optimized workspace layout represented by node 402g by traversing the tree 400 from the genesis node 402a through each successive generation of nodes by selecting an optimized layout at each level. The bolded path through nodes 402a, 402c, 402e, and 402h shows an example traversal of the tree to determine an optimized workspace layout.

In some implementations, other techniques for traversing a workspace layout tree can be applied to determine an optimized workspace layout. The workspace layout engine may generate a partial workspace layout tree that includes branches extending to a limited subset of the possible leaf nodes. For example, the system may generate complete candidate workspace layouts corresponding to a specified percentage (e.g., 10-percent) of possible leaf nodes from each higher-level node that represents a significant alternative to the layout of the workspace. Thus, a subset of leaf nodes could be spawned from both nodes 402b and 402c if both of these nodes were deemed to represent significant alternatives. The planner subsystem can then evaluate the leaf nodes and determine which branch(es) have produced the highest quality layouts. The system may then evaluate other workspace layouts along the highest quality branch(es) to determine an optimal layout along these branch(es). In this way, the system can efficiently evaluate alternative layouts to identify an optimized layout without needing to evaluate every possible alternative.

Figure 5:
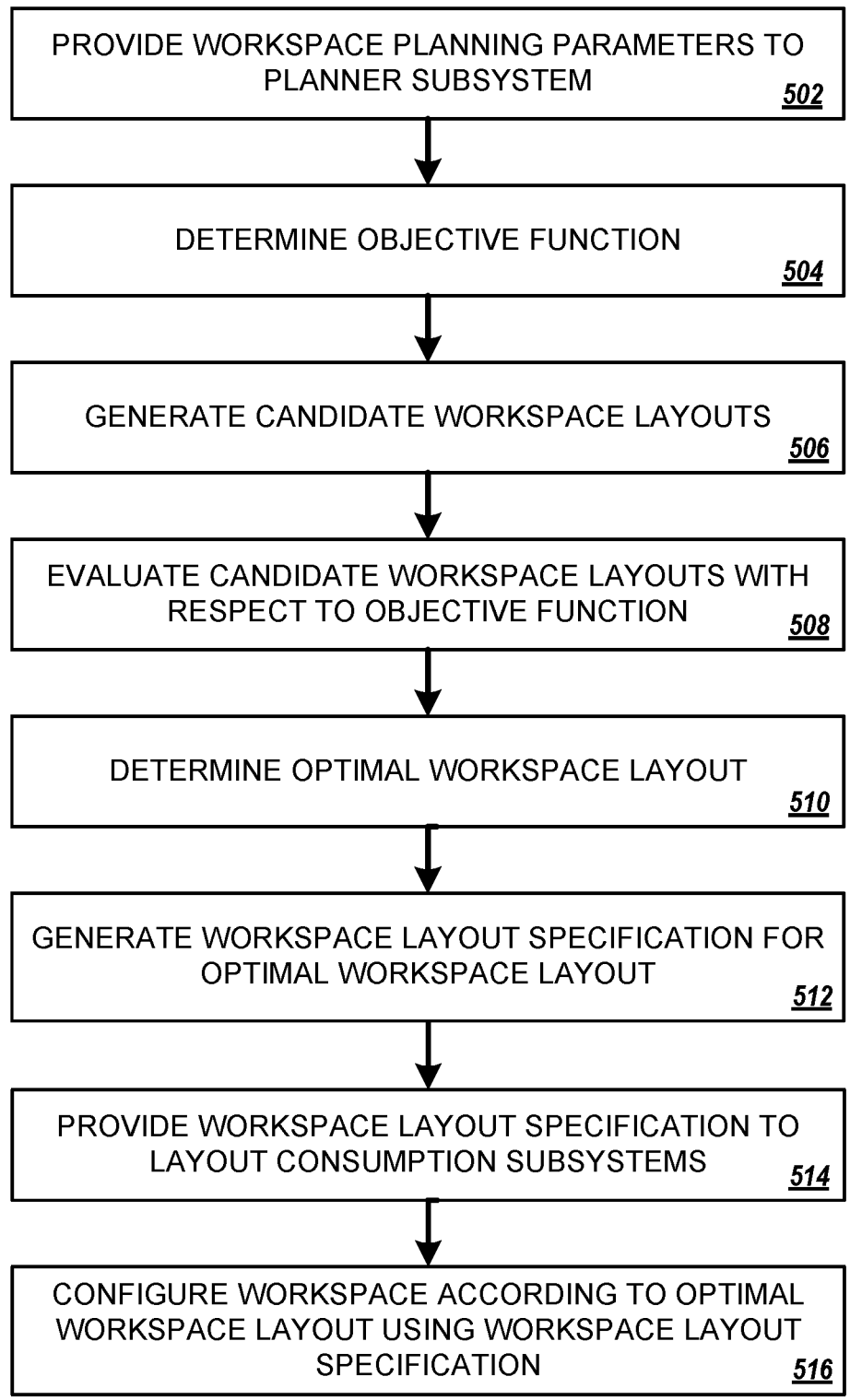
FIG. 5 is a flowchart of an example process for automatically generating and implementing an optimized workspace layout for a fabrication process.

FIG. 5 is a flowchart of an example process 500 for automatically generating and implementing an optimized workspace layout for a fabrication process. The process 500 can be carried out by a computing system having one or more computers in one or more locations, e.g., system 300 (FIG. 3). The system can include, for example, a planner subsystem, e.g., planner subsystem 302, a workspace layout engine, e.g., workspace layout engine 306, an optimization manager, e.g., optimization manager 308, a user terminal, e.g., user terminal 312, and one or more layout consumption subsystems, e.g., subsystems 310.

At stage 502, a set of workspace planning parameters are provided to the planner subsystem. The workspace planning parameters can include product design specification parameters, fabrication process parameters, environmental specification parameters, resource catalog parameters, or a combination of these. At stage 504, an objective function is determined for evaluating the quality of candidate workspace layouts. The objective function can include multiple components, each component representing a different workspace layout criteria. At stage 506, the workspace layout engine generates one or more candidate workspace layouts. In some implementations, the candidate layouts are generated according to a hierarchical candidate workspace layout tree that organizes candidate layouts based on inherited elements from other layouts and differences among sibling layouts. At stage 508, the planner subsystem evaluates the candidate workspace layouts to assess their quality using the objective function. The quality of a layout can be based, for example, on costs of resources employed in the layout and performance metrics associated with the layout that quantify how well and efficiently the layout facilitates the fabrication process. Performance metrics can be estimated in some implementations using a simulator that simulates the fabrication process within a virtual representation of the workspace arranged according to the candidate layout.

At stage 510, the system determines an optimized workspace layout. In some examples, the optimized workspace layout is the layout that best optimized the objective function from among the domain of layouts that were evaluated by the planner subsystem. In this sense, the optimized workspace layout may not be absolutely optimized in that no other workspace layouts would better optimize the objective function. Instead, a candidate workspace layout from the finite set of evaluated candidate workspace layouts that optimizes the objective function better than the other evaluated layouts may be deemed the optimized workspace layout.

At stage 512, the planner subsystem outputs a workspace layout specification that defines the optimized workspace layout. The workspace layout specification can include CAD drawings, structured data, executable computer code, and/or other data that describes the optimized workspace layout and provides sufficient information to enable humans, machines, or both to physically implement the optimized workspace layout in the real world. In some implementations, the workspace layout specification is provided to one or more layout consumption subsystems, e.g., a user interface subsystem, configurable workspace resources, printers, and/or distribution subsystems (stage 514). The layout consumption subsystems can process the workspace layout specification so as to present the optimized workspace layout to a user or program robots to self-configure in the workspace according to the optimized layout, for example. At stage 516, the workspace for the fabrication process is configured according to the optimal workspace layout using the workspace layout specification.

Figure 6:
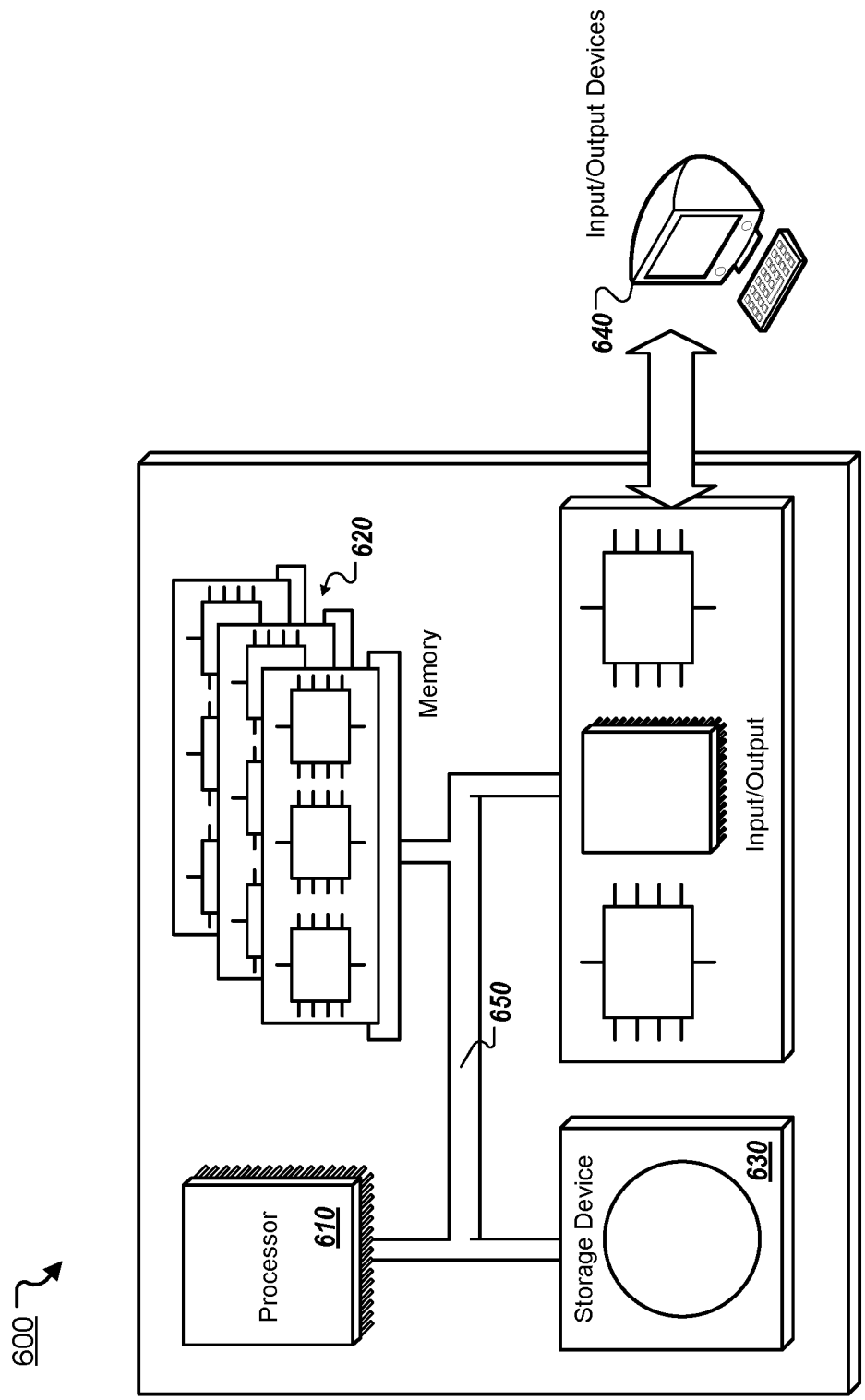
FIG. 6 is a schematic diagram of an example computer system for implementing computer-based systems and processes described in this specification.

FIG. 6 is a schematic diagram of a computer system 600. In some implementations, the system 600 can be employed as a computer in one or more of the systems described in this specification and to carry out any of the computer-based processes and methods described herein. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a request to generate a layout of a workspace for an automated robotic process to be performed by a plurality of mobile robots;
   generating a plurality of candidate workspace layouts that each have a different assignment of robots to a plurality of workcells, each workcell having a different location in the workspace, and wherein one or more of the plurality of candidate workspace layouts assign multiple robots to a same workcell;
performing an evaluation process on each of the plurality of candidate workspace layouts according to one or more workspace layout criteria;
selecting a final workspace layout based on the evaluation process; and
providing instructions to the plurality of mobile robots that cause the plurality of mobile robots to move to respective locations specified in the selected final workspace layout.

2. The method of claim 1, wherein generating the plurality of candidate workspace layouts comprises generating candidate workspace layouts that have different respective numbers of robots performing the robotic process.

3. The method of claim 1, wherein the automated robotic process is performed on workpieces that are moved by a conveyor track, and wherein the respective locations are different locations along the conveyor track.

4. The method of claim 1, wherein performing the evaluation process on the plurality of candidate workspace layouts comprises computing a score for each candidate workspace layout using an objective function that uses cost and speed as inputs.

5. The method of claim 4, wherein selecting a final workspace layout comprises selecting a candidate workspace layout having the highest score from the evaluation process.

6. The method of claim 1, wherein generating the plurality of candidate workspace layouts comprises generating a first candidate workspace layout that specifies a robot performing one task of the automated robotic process and a second candidate workspace layout that specifies the robot performing multiple tasks.

7. A system comprising:
one or more computers and one or more storage devices storing instructions that are operable, when executed by the one or more computers, to cause the one or more computers to perform operations comprising:
receiving a request to generate a layout of a workspace for an automated robotic process to be performed by a plurality of mobile robots;
generating a plurality of candidate workspace layouts that each have a different assignment of robots to a plurality of workcells, each workcell having a different location in the workspace, and wherein one or more of the plurality of candidate workspace layouts assign multiple robots to a same workcell;
performing an evaluation process on each of the plurality of candidate workspace layouts according to one or more workspace layout criteria;
selecting a final workspace layout based on the evaluation process; and
providing instructions to the plurality of mobile robots that cause the plurality of mobile robots to move to respective locations specified in the selected final workspace layout.

8. The system of claim 7, wherein generating the plurality of candidate workspace layouts comprises generating candidate workspace layouts that have different respective numbers of robots performing the robotic process.

9. The system of claim 7, wherein the automated robotic process is performed on workpieces that are moved by a conveyor track, and wherein the respective locations are different locations along the conveyor track.

10. The system of claim 7, wherein performing the evaluation process on the plurality of candidate workspace layouts comprises computing a score for each candidate workspace layout using an objective function that uses cost and speed as inputs.

11. The system of claim 10, wherein selecting a final workspace layout comprises selecting a candidate workspace layout having the highest score from the evaluation process.

12. The system of claim 7, wherein generating the plurality of candidate workspace layouts comprises generating a first candidate workspace layout that specifies a robot performing one task of the automated robotic process and a second candidate workspace layout that specifies the robot performing multiple tasks.

13. One or more non-transitory computer storage media encoded with computer program instructions that when executed by one or more computers cause the one or more computers to perform operations comprising:
receiving a request to generate a layout of a workspace for an automated robotic process to be performed by a plurality of mobile robots;
generating a plurality of candidate workspace layouts that each have a different assignment of robots to a plurality of workcells, each workcell having a different location in the workspace, and wherein one or more of the plurality of candidate workspace layouts assign multiple robots to a same workcell;
performing an evaluation process on each of the plurality of candidate workspace layouts according to one or more workspace layout criteria;
selecting a final workspace layout based on the evaluation process; and
providing instructions to the plurality of mobile robots that cause the plurality of mobile robots to move to respective locations specified in the selected final workspace layout.

14. The one or more computer storage media of claim 13, wherein generating the plurality of candidate workspace layouts comprises generating candidate workspace layouts that have different respective numbers of robots performing the robotic process.

15. The one or more computer storage media of claim 13, wherein the automated robotic process is performed on workpieces that are moved by a conveyor track, and wherein the respective locations are different locations along the conveyor track.

16. The one or more computer storage media of claim 13, wherein performing the evaluation process on the plurality of candidate workspace layouts comprises computing a score for each candidate workspace layout using an objective function that uses cost and speed as inputs.

17. The one or more computer storage media of claim 16, wherein selecting a final workspace layout comprises selecting a candidate workspace layout having the highest score from the evaluation process.

18. The one or more computer storage media of claim 13, wherein generating the plurality of candidate workspace layouts comprises generating a first candidate workspace layout that specifies a robot performing one task of the automated robotic process and a second candidate workspace layout that specifies the robot performing multiple tasks.

* * * * *